April 18, 1939.  A. E. BACHELET ET AL  2,154,886

SELECTIVE SIGNALING SYSTEM

Filed Aug. 25, 1937  2 Sheets-Sheet 1

INVENTORS: A. E. BACHELET
W. H. T. HOLDEN
BY
P. C. Smith
ATTORNEY

April 18, 1939.   A. E. BACHELET ET AL   2,154,886
SELECTIVE SIGNALING SYSTEM
Filed Aug. 25, 1937   2 Sheets-Sheet 2

INVENTORS: A. E. BACHELET
W. H. T. HOLDEN
BY
P. C. Smith
ATTORNEY

Patented Apr. 18, 1939

2,154,886

UNITED STATES PATENT OFFICE 2,154,886

SELECTIVE SIGNALING SYSTEM

Albert E. Bachelet, New York, and William H. T. Holden, Long Island City, N. Y.; said Bachelet assignor to Bell Telephone Laboratories, Incorporated, New York, N. Y., a corporation of New York, and said Holden assignor to American Telephone and Telegraph Company, a corporation of New York Application August 25, 1937, Serial No. 160,758

3 Claims. (Cl. 177—353)

This invention relates to signaling systems and has for its object to simplify such systems where it is desired to transmit a plurality of selective indications over a single circuit.

In the past it has been possible to transmit a plurality of signals over a single circuit by the use of alternating currents of a plurality of frequencies, which arrangement requires a plurality of generators and a corresponding plurality of tuned circuits.

In accordance with the present invention advantage is taken of the property of an ionic tube of passing no discharge current if the voltages, both alternating, applied to the control and anode circuits are displaced in phase by 180 degrees so as to be in phase opposition. When this is the case the control circuit prevents the passage of current through the anode to cathode circuit at the times when the anode to cathode voltage is of such direction and magnitude that, under suitable conditions at the control electrode, the discharge would ordinarily occur between the anode and cathode, while at times when the control electrode circuit would permit the discharge between the anode and cathode the voltage in this circuit is of such magnitude and polarity that no discharge can occur.

This phenomenon, as set forth hereinafter, is employed to provide means whereby selective signaling over a circuit can be accomplished providing any desired number of different selectively operated signals, and capable of operation over such circuit without affecting direct current signals which may also be transmitted thereover simultaneously and independently.

The invention will be more clearly understood from the following description read in connection with the drawings in which.

Figure 3:
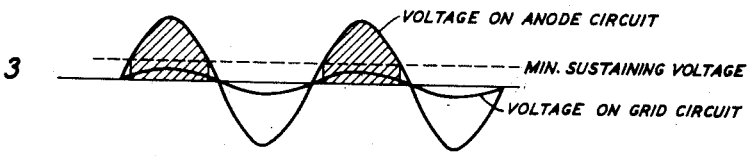
Figure 4:
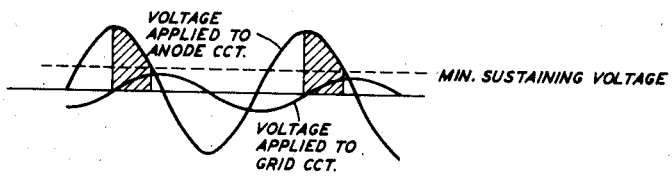
Figure 5:
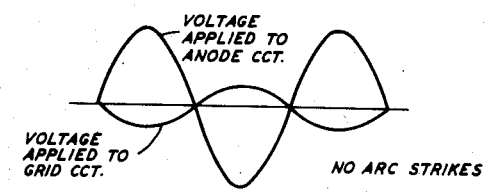
Figure 6:
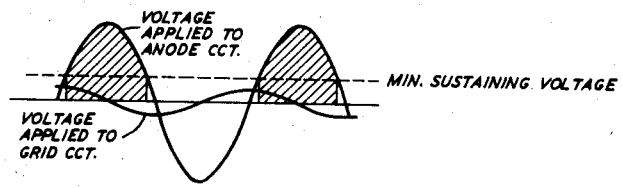

Figs. 3, 4, 5 and 6 illustrate the properties of a hot cathode discharge tube when operated with alternating grid and plate voltages, Fig. 3 showing the effect when the grid and anode voltages are in phase, Fig. 4 showing the grid voltage 90 degrees behind the anode voltage in phase, Fig. 5 showing the grid and anode voltages 180 degrees out of phase and Fig. 6 showing the grid voltage 90 degrees ahead of the anode voltage in phase.

The shaded portions of Figs. 3 to 6 indicate the period during which current passes in the anode-cathode circuit.

Figure 1:
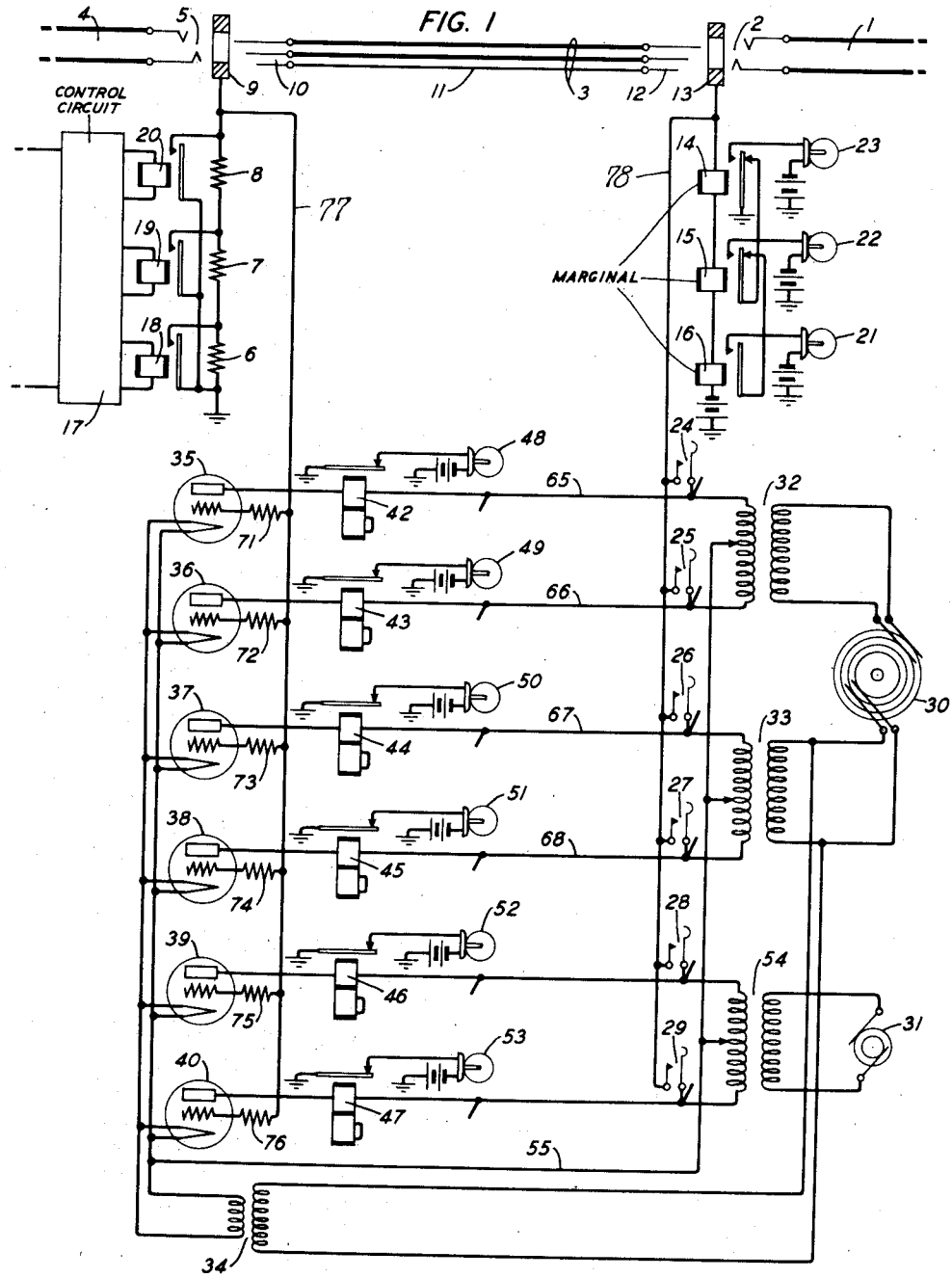
Fig. 1 shows a specific embodiment of the invention in circuit form.
Figure 2:
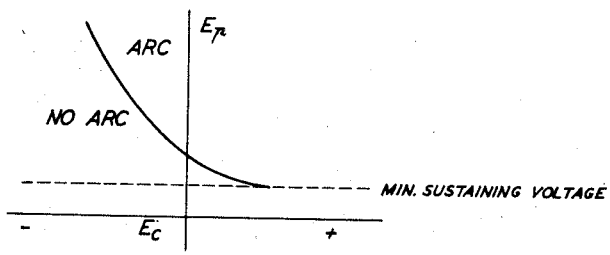
Fig. 2 is a graphic showing of the properties of the ionic tube of the hot cathode discharge type when direct current is applied to grid and plate.

Referring first to Fig. 1, the trunk circuit 1 terminating in jack 2 may be connected by cord 3 to trunk 4 through jack 5. While cord 3 has been shown for simplicity, the connection would ordinarily also include a local three-wire trunk with jacks 2 and 5 appearing at different operators' positions. Each position has a plurality of trunks incoming from and outgoing to different destinations.

For the purpose of signaling from the position of jack 5 to the position of jack 2 with cord 3 in jacks 2 and 5, a direct current marginal signaling circuit is provided extending from ground through resistances 6, 7 and 8, individual to trunk 4, sleeves 9, 10, 11, 12 and 13 of the jacks, plugs and cord, to the windings of relays 14, 15 and 16 individual to trunk 1 and battery. By means of the control circuit 17 which may be operated either from a distance or by a set of keys at the local position as desired, one of the relays 18, 19 and 20 is operated to transmit the desired information to the position at which jack 2 is located. With none of the relays 18 to 20 operated, the resistance in the circuit is too great to permit any of the marginal relays 14 to 16 to operate. With relay 18 operated, resistance 6 is short-circuited, increasing the current flow sufficiently to operate relay 16 which lights lamp 21. With relay 19 operated resistances 6 and 7 are both short-circuited, operating both relays 15 and 16 and lighting lamp 22. With relay 20 operated, direct ground is connected to the sleeve 9 of jack 5 operating all three of the relays 14 to 16 and lighting lamp 23.

The alternating current signals are arranged to be transmitted from the position at which jack 2 appears to the position at which jack 5 appears and are controlled by the keys 24 to 29 inclusive, which are individual to trunk 1. In order to operate these signals, only two sources of alternating current of different frequencies 30 and 31 are provided, source 30 being a two-phase generator having one phase connected to transformer 32 and the other to transformer 33, the latter phase being also connected to transformer 34 which supplies filament-heating current to the cathodes of ionic tubes 35 to 40. Source 31 is connected to transformer 54. These transformers are connected in multiple to all positions using this type of signaling and may be the same sources as are used for ringing or other low-frequency signaling.

At the position of jack 5, a set of tubes 35 to 40 is provided individual to each trunk circuit, the cathodes of which are connected in parallel to the secondary of transformer 34 as mentioned above. The grids or control electrodes of all of the tubes of a set are connected through individual resistances 71 to 76 and in multiple to the sleeve 9 of jack 5.

Considering tube 35 as an example, the anode circuit thereof is connected through the winding of relay 42 to conductor 65 which is connected to the upper terminal of the secondary winding of transformer 32. The anode of tube 36 is connected through the winding of relay 43 to the lower terminal of transformer 32, the anodes of tubes 37 and 38 are connected respectively through the windings of relays 44 and 45 to the upper and lower terminals of the secondary winding of transformer 33 and the anodes of tubes 39 and 40 are connected respectively through the windings of relays 46 and 47 to the upper and lower terminals of the secondary winding of transformer 54. Relays 42 to 47 inclusive have their lower windings short-circuited to render them slow to release and over their back contacts control the circuits of lamps 48 to 53 inclusive.

The middle points of the secondary windings of transformers 32, 33 and 54 are connected together and to conductor 55 which in turn is connected to the cathodes or filaments of the tubes 35 to 40. If now the keys 24 to 29 are all released or if the cord is removed from one or both jacks, the grid circuits of the tubes 35 to 40 will be open and all of the tubes will be permitted to become conductive, in turn operating relays 42 to 47 and preventing the lighting of any of the lamps 48 to 53.

With the cord in place, if one of the keys, for example key 25 is operated, alternating current of the same frequency as that applied to the anode circuit of tube 35, but 180 degrees out of phase therewith, will be applied to the grids of all of the tubes 35 to 40 over key 25, sleeves 13, 12, 11, 10 and 9 and resistances 71 to 76 inclusive. This will extinguish the discharge in the tube 35, releasing relay 42 and causing lamp 48 to light. Under this condition the anode and grid voltages of the tube 35 will be in the phase relation shown in Fig. 5. In tube 36, whose anode circuit is connected to conductor 66 through the winding of relay 43, the grid and anode voltages will be in phase as illustrated in Fig. 3. In tube 37, the anode is connected through the operating winding of relay 44 to conductor 67 and thence to the upper secondary terminal of transformer 33 while the anode of tube 38 is connected to conductor 68 which leads to the lower secondary terminal of transformer 33, through the operating winding of relay 45. Therefore, when key 25 is closed, the grid voltage impressed upon tubes 37 and 38 will be in the phase relation to the anode voltages shown in Figs. 4 and 6 respectively. There will, therefore, be a reduction in the average rectified anode current in one of these tubes but this will be insufficient to cause the anode relays to release. In the case of tubes 39 and 40, the grid and anode are supplied with currents of different frequency and the discharge will not be stopped, although low frequency pulsation of the average current may occur in the anode circuits of these tubes. If this pulsation is at a frequency greater than 1, the short-circuited windings of the relays 46 and 47 will prevent their release. Such short-circuited windings, which give the relays a slow-release characteristic, prevent chattering on such pulsating unidirectional currents flowing in the anode circuits.

The effect of the other keys will be apparent from an inspection of the drawings and comparison with the above description.

From the foregoing description it will be seen that the discharge between anode and cathode in one and only one of the tubes 35 to 40, inclusive, will be quenched, and, upon release of the anode relay thereof, one and only one of the lamps 48 to 53, inclusive, will light whenever any one of the keys 24 to 29 is operated. Furthermore, since the alternating current circuits for operating these ionic tubes are arranged without ground, they operate independently of the direct current signals transmitted from jack 5 to jack 2 over the sleeve of the cord. If desired, large capacity condensers might be inserted in conductors 77 and 78 and conductor 55 might be grounded as an alternative to the arrangement shown. It will be apparent that, although the circuits disclosed are sufficient to illustrate the principles of the invention, it would be possible to arrange circuits of more complex types and to control the signaling by means automatically controlled by the type of trunk to be used. This might be accomplished by permanently connecting a suitable indication to the sleeve of the jack.

What is claimed is:

1. In a system for selective signaling, conducting means, a plurality of marginal relays, means to control said relays by means of direct currents of various magnitudes flowing over said conducting means, signals controlled by said relays, other signals and means for controlling said other signals independent of said marginal relays, comprising a plurality of three-element gas-filled tubes, a plurality of sources of alternating voltage differing in phase or frequency, each source connected individually to the anode of one of said tubes, the control electrodes of said tubes being connected together and to said conducting means, said tubes being normally in conducting condition, means for applying to said conducting means an alternating voltage of such phase and frequency that the electrical discharge in a predetermined one of said plurality of tubes is interrupted and means responsive to the interruption of said discharge to control said other signals.

2. In a system for selective signaling, conducting means, a plurality of marginal relays, means to control said relays by means of direct currents of various magnitudes flowing over said conducting means, signals controlled by said relays, other signals and means for controlling said other signals independent of said marginal relays, comprising a plurality of three-element gas-filled tubes, a plurality of sources of alternating voltage differing in phase or frequency, each source connected individually to the anode of one of said tubes, the control electrodes of said tubes being connected together and to said conducting means, said tubes being normally in conducting condition, means for applying to said conducting means an alternating voltage of such phase and frequency that the electrical discharge in a predetermined one of said plurality of tubes is interrupted, and relays in each of said anode circuits responsive to the interruption of discharge current in said anode circuits to control said other signals.

3. In a system for selective signaling, conducting means, a plurality of marginal relays, means to control said relays by means of direct currents of various magnitudes flowing over said conducting means, signals controlled by said relays, other signals and means for controlling said other signals independent of said marginal relays, comprising a plurality of three-element gas-filled tubes, a plurality of sources of alternating voltage differing in phase or frequency, each source connected individually to the anode of one of said tubes, the control electrodes of said tubes being connected together and to said conducting means, said tubes being normally in conducting condition, means to apply to said conducting means the alternating voltage from any one of said sources, said voltage being effective to interrupt the electrical discharge in a corresponding predetermined one of said tubes, and means responsive to the interruption of said discharge to control one of said other signals.

ALBERT E. BACHELET.
WILLIAM H. T. HOLDEN.